United States Patent [19]
Levy

[11] 3,820,651
[45] June 28, 1974

[54] DETACHABLE PLASTIC SHIPPING BAGS

[76] Inventor: Alfred W. Levy, 50 Salem Ridge Dr., Huntington, N.Y. 11743

[22] Filed: Nov. 13, 1972

[21] Appl. No.: 305,940

[52] U.S. Cl. ............... 206/390, 229/69, 150/52 R
[51] Int. Cl. .................... B65d 27/10, B65d 85/66
[58] Field of Search ..... 206/57 A, 58, 56 AB, 46 H; 229/62, 69; 150/52 R; 220/65

[56] References Cited
UNITED STATES PATENTS

| | | | |
|---|---|---|---|
| 2,299,355 | 10/1942 | Stolpman | 217/37 |
| 3,300,082 | 1/1967 | Patterson | 206/58 |
| 3,481,461 | 12/1969 | Paxton | 206/56 AB |
| 3,674,135 | 7/1972 | Simon | 229/62 |

Primary Examiner—William T. Dixson, Jr.
Attorney, Agent, or Firm—Bauer & Amer

[57] ABSTRACT

Comparatively large plastic bags, each having the requisite size to accommodate a conventional two-wheel bicycle therein during its shipment and, despite such size, convenient to handle because the bags are detachably connected end-to-end and put up in a supply roll from which each bag is readily removed one at a time when needed. Each bag also has a removable portion which advantageously serves as a tying strip for holding the bicycle handle bars in the plane of the bicycle and thereby facilitating its placement within the bag.

1 Claim, 5 Drawing Figures

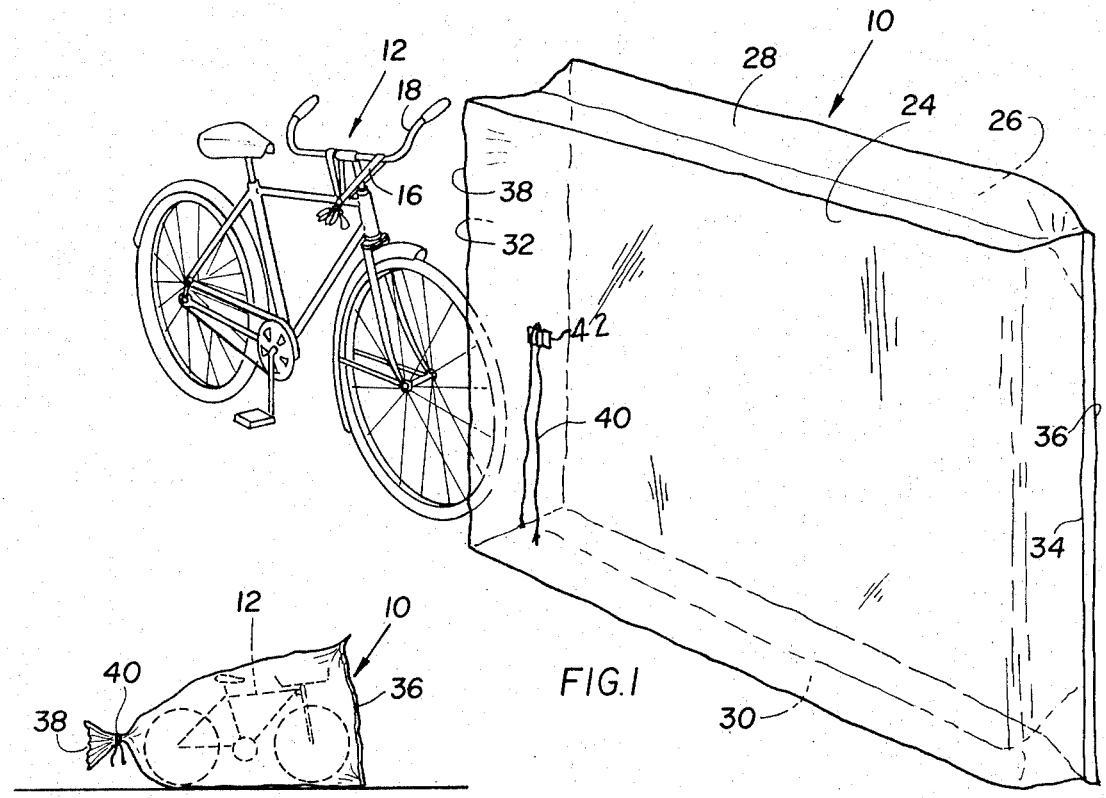
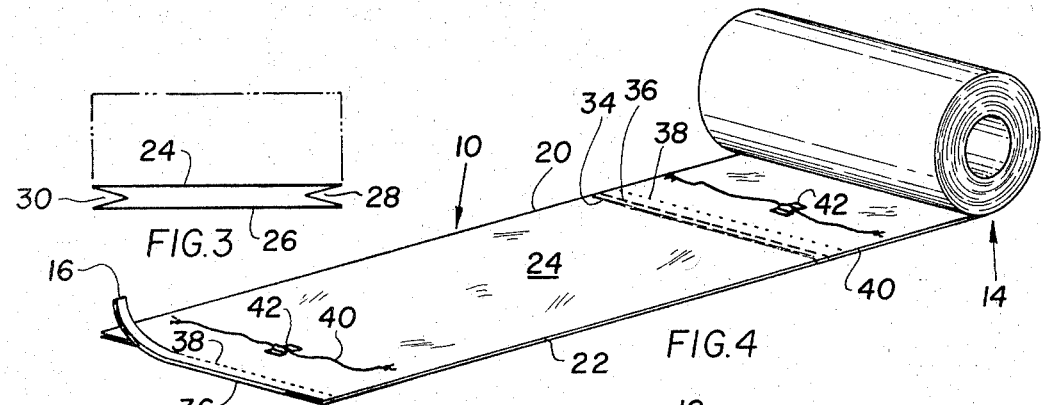
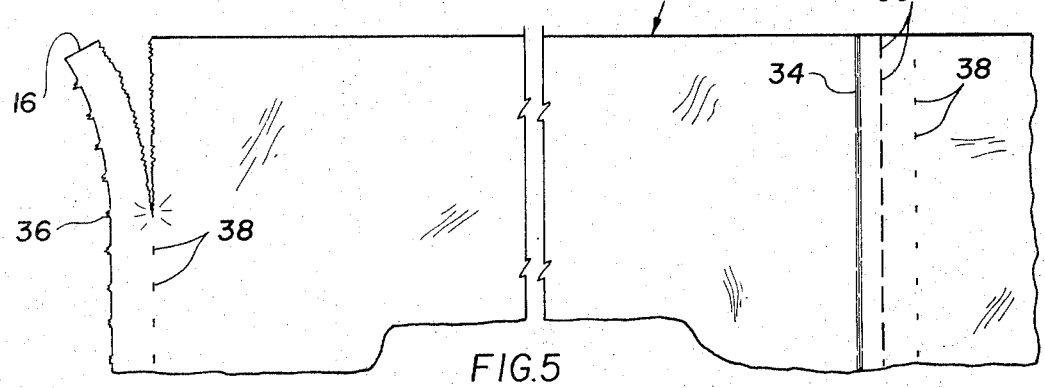

DETACHABLE PLASTIC SHIPPING BAGS

The present invention relates generally to an improved shipping container for a two-wheel bicycle or similar sized product, and more particularly to a detachably connected supply of plastic bags adapted to conveniently serve as a source of protective covering or container for a bicycle or the like.

An important contribution of the present invention is the recognition that despite the excessive size required in a plastic bag that will accommodate a conventional two-wheel bicycle that it can nevertheless be put up in a supply roll for convenience in handling and thus be effectively used as a bicycle shipping container, in lieu of wooden crates or the like. In such an end-use, the plastic bag provides moisture barrier protection which, in many instances, cannot even be provided by other types of containers.

Additionally, the plastic material is used, in accordance with the present invention, in the tying of the bicycle in its proper shipping condition, thereby providing an advantage which is not readily attainable when using some other type of shipping container.

Broadly, it is an object of the present invention to facilitate the shipment of bicycles or the like by the use of a plastic shipping bag which possesses noteworthy advantages over prior art containers used for this purpose. Specifically, it is an object to provide an improved supply of plastic shipping bags which conveniently provides one bag at a time for use, and each of which is especially adapted for protecting a bicycle or similar sized product during shipment.

A supply of detachable plastic shipping bags demonstrating objects and advantages of the present invention comprises a supply roll of a heat sealable plastic tube delineated into bag-lengths by spaced heat seals along its length. Also at spaced intervals are first and second lines of perforations, one readily promoting complete rupture in the tube and thereby contributing to detachment of each bag from the supply roll, and the other, by requiring more effort to promote rupture, facilitating the subsequent removal from a detached bag of a tying strip which can advantageously be used on the shipped product, particularly if it is a bicycle.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of a detached plastic bag especially adapted for shipping a bicycle;

FIG. 2 is a side elevational view, on a reduced scale, illustrating the bicycle in shipping condition within the bag;

FIG. 3 is an end elevational view illustrating the side gussets of the bag which increase the internal volume thereof;

FIG. 4 is a perspective view showing an elongated arrangement of the shipping bags attached end-to-end to each other and put up in a supply roll; and FIG. 5 is a plan view of a supply length from said supply roll illustrating in greater detail the structural features of the bag, and wherein a tying strip is shown partially removed on the bag.

Reference is now made to the drawings wherein there is shown a plastic shipping bag, generally designated 10, having features, as will be described subsequently in detail herein, which specifically adapts the same to accommodate and protect a typical two-wheel bicycle 12 during shipment. These features, which in a noteworthy manner enable the bag 10 to advantageously serve this purpose, include firstly, that the bag has a requisite shape and size, as illustrated in FIG. 1, to accommodate the bicycle 12. Despite this size, which ordinarily would render it unwieldy to handle the bag 10, the handling is not a problem because the bag 10 is conveniently put up in a supply roll 14, as illustrated in FIG. 4, and thus each bag 10 is removed from such supply roll only when needed. Secondly, provision is made on each bag 10, as will be described in greater detail subsequently, to make available a tying strip 16 which, as illustrated in FIG. 1, is advantageously used to hold the bicycle handle bars 18 in the plane of the bicycle 12, thus facilitating the placing of the bicycle 12 within the protective confines of the bag 10, as illustrated in FIG. 2. The bag 10 contains other noteworthy features to enable it to function effectively as a shipping container for a typical two-wheel bicycle 12; such features will be evident from the description which follows.

In a preferred form, each shipping bag 10 hereof is made from a heavy gauge heat sealable plastic tube which, in the flat, is approximately three and one-half feet between its side edges 20 and 22. Between the edges 20, 22, the facing walls of the plastic tube naturally serve as the front and rear walls 24 and 26, respectively, for each individual bag 10. As generally understood in bag manufacture, an unfolded flap in each of the sides of the bag provides a side gusset 28 and 30, the unfolding of which increases the internal volume 32 bounded by the front and rear walls 24, 26 and the just mentioned side gussets 28, 30.

Using conventional bag-making equipment, the present invention contemplates the processing of the tubular plastic through such equipment during which a transversely oriented heat seal 34 is applied at spaced intervals along the tube thereby effectively enclosing one end of what is ultimately each bag 10, this end being the front bag end, as illustrated in FIG. 1. As already noted, however, to facilitate handling, the bags 10 are left in an end-to-end attached arrangement so that in such arrangement they can be put up in a supply roll 14, the end of a supply length of which can be unwound to expose one bag at a time which, according to the present invention, is readily detached therefrom preparatory to use.

Referring specifically to FIGS. 1 and 5, it will be understood that to promote the ready detachment of an individual bag 10 from the supply roll 14 thereof, the plastic tube is provided with spaced transversely oriented perforations 36, the location of each line of perforations 36 being slightly behind and generally parallel to each heat seal 34. Thus, the line of perforations 36 adjacent the heat seal line 34 which is illustrated in FIG. 4 delineates the front edge of the bag 10, whereas the other line of perforations 36 which is spaced a bag-length from the heat seal 34 delineates the rear edge of such bag 10 (i.e., that edge along which the bag adjacent to the bag 10 was detached from the supply roll).

In accordance with the present invention, in addition to the spaced line of perforations 36, the plastic tube is also provided with a second transversely oriented line of perforations 38, also spaced a bag-length from each other along the length of the plastic tube 14. It will be understood that by either the number of the perforations which constitute the line of perforations 36 or by the extent of each such perforation that the same contribute to such an extent of partial severing in the plastic walls 24 and 26 that very little force is necessary to complete the rupturing of the walls along the perforations 36 and thus result in detachment of an individual plastic bag 10 at this location. Conversely, the line of perforations 38 which is adjacent to the bag front edge perforations 36 is purposely not constituted, either in number of perforations or in the extent of each such perforation, so as to promote rupture of the plastic wall in a more facilitated manner than such rupture occurs at the perforations 36. In effect, therefore, the line of perforations 36 constitutes an easy tear line, whereas the perforations 38 constitute a difficult tear line.

As a result of the foregoing, there is no difficulty experienced in detaching a bag 10 which occupies the end position on the supply length unwound from the supply roll 14 along the perforations or transverse line 36 rather than along the adjacent line of perforations 38. Once the bag 10 is detached from the supply roll 14, it is then contemplated that a plastic loop, as defined between the rear edge 36 and line of perforations 38, will be removed from the bag 10 to serve as the previously referred to tying strip 16. Naturally, the perforations 38 facilitate removal of the strip 16 and, at this time, do not interfere with the detachment of a bag one at a time from the supply roll 14 since the bag 10 has already been detached therefrom.

Completing the preferred embodiment of each shipping bag 10 is a bag closure means in the form of a tie, string or cord 40 which is secured to a surface of each bag 10 by an adhesive patch 42 or the like remote from the bag opening. This enables the closure of the bag opening a distance remote from the bag end and providing a constantly available closure means.

From the foregoing, it should be readily appreciated that bag 10 greatly facilitates the preparation of bicycle 12 for shipment and also the maintenance of said bicycle 12 in proper shipping condition during transportation of the bicycle from, for example, its place of manufacture to its place of use. To this end, it is contemplated that the connection of the handlebars 18 to the body of the bicycle will be loosened and turned so that the bars 18 occupy a position which is in the plane of the bicycle, as illustrated in FIG. 1. This advantageous shipping position of the handlebars 18 is then maintained using the plastic tying strip 16, which strip is removed from its end position bounding the bag opening 32. Additionally, the foot pedals of the bicycle 12 may be removed to minimize the width or lateral size of the bicycle so that it readily fits within the confines of the bag 10. It is not necessary, however, that these foot pedals be removed and, in fact, the bag 10 can even accommodate a tricycle having a moderately wide rear axle because of the flexibility of the bag walls 24 and 26, and thus the ability of these walls to be displaced laterally to accommodate the bicycle. In all instances, however, whether the shipped product is a bicycle or tricycle, its placement within the bag 10 is greatly facilitated by the fact that it can be wheeled through the protective confines of the bag.

It will be recognized by those skilled in the art that the present bag 10 is quickly and easily utilized to ship cycled vehicles from place to place, and more particularly is helpful in the shipment of such vehicles on airplanes, boats, trains and the like. In this regard, it is merely necessary to spread open the bag and wheel the vehicle into position within the bag. The presence of the closure device 40 secured to a surface of the bag makes it constantly available for use and avoids its possible loss. When the bag and its contents reach their destination, the closure device is easily opened and remains secured to the bag surface at a position remote from the bag opening, thereby avoiding its possible loss and damage. In this way, the bag and its closure device are available for repeated uses while the tying strip 16 is always available for use simply by removing it from the vehicle removed from the bag and placing it in the bag for the next use.

Although the present bag has been described as being removed from a roll, it can be provided in flat condition.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A supply of detachable plastic shipping bags comprising an elongated plastic tube put up in a supply roll, transversely oriented heat seals at selected intervals along said tube defining a shipping bag between each adjacent pair of transversely oriented perforations located adjacent each adjacent pair of heat seals delinating the front and rear respectively of each said shipping bag, and in each said delineated shipping bag a second arrangement of transversely oriented perforations spaced from the rear edge thereof delineating a removable tying strip, said first arrangement of perforations being more closely spaced and more in number than the spacing and number of said second arrangement of perforations so as to be operatively effective to promote rupture in said tube before said second arrangement of perforations such that each said shipping bag is first readily detached from said supply roll and each said tying strip thereof forms an uninterrupted tying loop that is then readily detached from said shipping bag.

* * * * *